United States Patent [19]
Nishikawa et al.

[11] Patent Number: 5,830,953
[45] Date of Patent: Nov. 3, 1998

[54] PROCESS FOR PRODUCING ESTER-SUBSTITUTED POLYVINYL ALCOHOL AND THIN FILM USING THE SAME

[75] Inventors: Hideyuki Nishikawa; Ken Kawada, both of Ashigara, Japan

[73] Assignee: Fuji Photo Film Co., Ltd., Kanagawa, Japan

[21] Appl. No.: 824,116

[22] Filed: Mar. 26, 1997

[30] Foreign Application Priority Data

Mar. 26, 1996 [JP] Japan .................................. 8-069527
Oct. 21, 1996 [JP] Japan .................................. 8-278433

[51] Int. Cl.$^6$ ..................................................... C08F 20/00
[52] U.S. Cl. ........................................ 525/329.5; 528/392
[58] Field of Search .......................... 528/392; 525/329.5

[56] References Cited

PUBLICATIONS

Seki et al., Thin Solid Films, 179 (Apr., 1989), pp. 77–83, "Formation and Langmuir–Blodgett Deposition of Monolayers of Poly(Vinyl Alcohols)s Bearing Azobenzene Side––Shains of Varied Spacer Length".

Seki et al., Langmuir 1993, 9, pp. 211–218, "'Command Surfaces' of Langmuir–Blodgett Films. Photoregulations of Liquid Crystal Alignment by Molecularly Tailored Surface Azobenzene Layers."

Seki et al., Polymer Communications, (Apr., 1989), vol. 30, pp. 108–110, "Formation and Langmuir–Blodgett deposition of monolayers of poly(vinyl alcohol) having azobenzene side chains".

Kobunshi Jikkengaku Koza, vol. 12, Ch. 4, (1957) (and English translation).

Kobunshi Jikkengaku, vol. 6, Ch. 2 (1978) (and English translation).

*Primary Examiner*—Terressa Mosley
*Attorney, Agent, or Firm*—Birch, Stewart, Kolasch & Birch, LLP

[57] ABSTRACT

A process for producing ester-substituted polyvinyl alcohol from a compound having a carboxyl group and polyvinyl alcohol, which comprises converting the compound having a carboxyl group to an active derivative thereof and reacting the active carboxylic acid derivative with polyvinyl alcohol in the presence of a base the conjugate acid of which has a pKa of 11 or more; and a thin film, provided on a transparent substrate, which comprises a film of the ester-substituted polyvinyl alcohol as a liquid crystal alignment layer and an optically anisotropic layer containing a discotic liquid crystal compound which has at least one substituent capable of forming a new bond intermolecularly or intramolecularly and which is capable of forming a discotic nematic phase.

10 Claims, No Drawings

PROCESS FOR PRODUCING ESTER-SUBSTITUTED POLYVINYL ALCOHOL AND THIN FILM USING THE SAME

FIELD OF THE INVENTION

This invention relates to a process for producing ester-substituted polyvinyl alcohol which is useful as a functional high polymer providing high polymeric liquid crystals, an LB film, a liquid crystal alignment (orientation) film, and the like. The invention also relates to a thin film containing the ester-substituted polyvinyl alcohol.

BACKGROUND OF THE INVENTION

It is known that ester-substituted polyvinyl alcohol can be prepared by the reaction between polyvinyl alcohol swollen with pyridine and a carboxylic acid chloride or anhydride as described, e.g., in *Kobunshi Jikkenqaku Koza*, Vol. 12, Ch. 4 (1957) and *Kobunshi Jikkengaku*, Vol. 6, Ch. 2 (1978). However, the method is difficult to apply to production of derivatives having a low degree of substitution with an ester group because of the heterogeneity of the reaction system.

Use of dimethylformamide (DMF) or dimethylacetamide (DMAC) as a solvent has been reported by T. Seki, et al. in *Thin Solid Films*, Vol. 179, p. 77 (1989), *Polymer Communications*, Vol.30, p. 108 (1989) and *Langmuir*, Vol. 9, p. 211 (1993). However, most of polyvinyl alcohol species are not so soluble in these solvents. Moreover, chloroform or benzene used in combination, as reported, is highly toxic and unfavorable in industrial production.

On the other hand, rod-shaped liquid crystal compounds are of wide use in LCD, etc. Compared with the rod-shaped ones, discotic liquid crystal compounds have not been made full use of. Since discotic liquid crystal compounds are different from rod-shaped ones in optical anisotropy, they would be utilized as a useful optical material if they could be orientated similarly to the rod-shaped ones. However, we have no technique as yet for orientating discotic liquid crystal molecules easily and sufficiently.

SUMMARY OF THE INVENTION

An object of the present invention is to provide a process for producing ester-substituted polyvinyl alcohol from a compound having a carboxyl group and polyvinyl alcohol, in which the reaction system is homogeneous, and toxic benzene or chloroform is not used.

Another object of the present invention is to provide a thin film of a discotic liquid crystal compound in which the molecules of the compound are orientated by use of the ester-substituted polyvinyl alcohol obtained by the above-described process, and a process for producing the thin film.

SUMMARY OF THE INVENTION

As a result of extensive investigation, the inventors of the present invention have found that the above objects are accomplished by a process for producing ester-substituted polyvinyl alcohol from a compound having a carboxyl group and polyvinyl alcohol, which comprises converting the compound having a carboxyl group to an active derivative thereof and reacting the active carboxylic acid derivative with polyvinyl alcohol in the presence of a base the conjugate acid of which has a pKa of 11 or more; and a thin film provided on a transparent substrate by forming a film of ester-substituted polyvinyl alcohol and further forming on the film at least one optically anisotropic layer containing at least one discotic liquid crystal compound which has at least one substituent capable of forming a new bond intermolecularly or intramolecularly and which is capable of forming a discotic nematic phase, the ester-substituted polyvinyl alcohol being prepared by a process comprising converting a compound having at least one substituent capable of forming a new bond intermolecularly or intramolecularly and a carboxyl group to an active derivative thereof and reacting the active carboxylic acid derivative with polyvinyl alcohol in the presence of a base the conjugate acid of which has a pKa of 11 or more.

The process according to the invention includes the following embodiments:
1) The process wherein the base the conjugate acid of which has a pKa of 11 or more is 1,8-diazabicyclo[5.4.0]undec-7-ene (hereinafter DBU).
2) The process wherein the active carboxylic acid derivative is a mixed anhydride.
3) The process wherein the compound having a carboxyl group is a compound having a functional group susceptible to addition reaction or hydrolysis.
4) The process wherein the reaction of the active carboxylic acid derivative and polyvinyl alcohol is carried out in the presence of dimethyl sulfoxide (hereinafter DMSO) as a solvent.

The thin film according to the invention includes the following embodiments:
1) The thin film which comprises a polymer composition obtained as a result of formation of a new bond by said substituent capable of forming a new bond intermolecularly or intramolecularly.
2) The thin film wherein the optically anisotropic layer contains at least one compound selected from discotic liquid crystal compounds other than said discotic liquid crystal compound and other organic compounds.
3) The thin film wherein the disc plane of the discotic liquid crystal compound tilts with respect to the plane of the transparent substrate at a tilt angle varying in the thickness direction of the optically anisotropic layer.

DETAILED DESCRIPTION OF THE INVENTION

The compound having a carboxyl compound which can be used in the invention includes saturated fatty acids, such as propanoic acid, butanoic acid, pentanoic acid, hexanoic acid, heptanoic acid, octanoic acid, nonanoic acid, decanoic acid, and dodecanoic acid; unsaturated fatty acids, such as acrylic acid, methacrylic acid, crotonic acid, propynoic acid, 2-pentenoic acid, 2-heptenoic acid, and 2-octenoic acid; carbocyclic carboxylic acids, such as cyclohexanecarboxylic acid, benzoic acid, a 4-alkylbenzoic acid, a 4-alkoxybenzoic acid, naphthalenecarboxylic acid, and cinnamic acid; and heterocyclic carboxylic acids, such as furanecarboxylic acid, nicotinic acid, and pyrrolecarboxylic acid.

These carboxylic acids may be substituted with the substituents described in C. Hansch, A. Leo, and R. W. Taft, *Chem. Rev.*, Vol. 91, pp. 165–195 (published by American Chemical Society) (1991), exemplified by an alkoxy group, an alkyl group, an alkoxycarbonyl group, and a halogen atom. The carboxylic acid may also have in the molecule thereof such a functional group as an ether group, an ester group, a carbonyl group, a thioether group, a sulfoxide group, a sulfonyl group or an amido group. In particular, those having a functional group weak against an acid, for example, a functional group susceptible to hydrolysis or addition reaction in the molecule thereof are preferred. Specific examples of such a functional group are an $\alpha,\beta$- unsaturated-carbonyl group (e.g., an acryloyl group, a methacryloyl group, a crotonoyl group), an enol ether group (e.g., a vinyl ether group), an epoxy group, an acetal group, and a silyl ether group. Examples of the carboxylic acids having an acryloyl group are 4-acryloyloxybutanoic acid, 6-acryloyloxyhexanoic acid, 8-acryloyloxyoctanoic acid, 10-acryloyloxydecanoic acid, 4-(4-acryloyloxybutyloxy) benzoic acid, 4-(6-acryloyloxyhexyloxy)benzoic acid, 4-(8-acryloyloxyoctyloxy)benzoic acid, and 4-(10-acryloyloxydecyloxy)benzoic acid. Examples of the carboxylic acids having a methacryloyl group are 4-methacryloyloxybutanoic acid, 6-methacryloyloxyhexanoic acid, 8-methacryloyloxyoctanoic acid, 10-methacryloyloxydecanoic acid, 4-(4-methacryloyloxybutyloxy)benzoic acid, 4-(6-methacryloyloxyhexyloxy)benzoic acid, 4-(8-methacryloyloxyoctyloxy)benzoic acid, and 4-(10-methacryloyloxydecyloxy)benzoic acid. Examples of the carboxylic acids having a vinyl ether group are 4-vinyloxybutanoic acid, 6-vinyloxyhexanoic acid, 8-vinyloxyoctanoic acid, 10-vinyloxydecanoic acid, 4-(4-vinyloxybutyloxy)benzoic acid, 4-(6-vinyloxyhexyloxy) benzoic acid, 4-(8-vinyloxyoctyloxy)benzoic acid, and 4-(10-vinyloxydecyloxy)benzoic acid.

As regards the active carboxylic acid derivative for use in the invention, the description of Izumiya Nobuo, *Peptidie Gosei*, Ch. 5, Maruzen (1975) can be referred to. Specifically, the active carboxylic acid derivatives include acid halides, acid anhydrides, mixed anhydrides, and active esters, with mixed anhydrides being preferred.

Acids used as a counterpart of the carboxylic acid for the preparation of mixed anhydrides include carbonic acid esters (e.g., monoethyl carbonate), O-alkyl dithiocarbonic acids (e.g., O-ethyl ditihocarbonic acid), carboxylic acids (e.g., pivalic acid and trifluoroacetic acid), sulfonic acids (e.g., methanesulfonic acid and toluenesulfonic acid), and inorganic acids (e.g., phosphoric acid). Preferred of them are sulfonic acids. Methanesulfonic acid is especially preferred. The counterpart acid is reacted in the form of an acid chloride. The acid chloride is used usually in an amount of 0.9 to 1.05 equivalent, preferably 1.0 equivalent, to the carboxylic acid.

Solvents for use in the preparation of the mixed anhydride include 1,2-dimethoxyethane, 1,4-dioxane, tetrahydrofuran (THF), ethyl acetate, dimethylformamide (DMF), and dimethylacetamide (DMAC), with THF and ethyl acetate being preferred.

Bases for use in the preparation of the mixed anhydride include tertiary amines (e.g., triethylamine, diisopropylamine, tributylamine, and N-methylmorpholine) and pyridines (e.g., pyridine, picoline, and lutidine). Triethylamine and diisopropylamine are preferred of them. The base is used usually in an amount of 1.0 to 2.0 equivalents, preferably 1.0 to 1.1 equivalent, to the carboxylic acid.

The reaction for the mixed anhydride preparation is carried out at a temperature of form $-30°$ to $15°$ C., preferably $-20°$ to $5°$ C.

Preparation of the mixed anhydride can be carried out by dropwise addition of an acid chloride to a mixture of a carboxylic acid, an amine (base), and a solvent; dropwise addition of an amine to a mixture of a carboxylic acid, an acid chloride, and a solvent; or dropwise addition of a mixture of a carboxylic acid, an amine, and a solvent to a mixture of an acid chloride and a solvent. The last method is preferred.

It is preferable that the active carboxylic acid derivative be previously dissolved or suspended in a solvent and be added dropwise to a solution of polyvinyl alcohol. The solvent to be used here includes 1,2-dimethoxyethane, 1,4-dioxane, THF, ethyl acetate, DMF, and DMAC. The dropwise addition is conducted preferably over a period of 10 minutes to 4 hours, still preferably 30 minutes to 2 hours. During the dropwise addition, it is preferable that the temperature of the active carboxylic acid derivative be controlled within a range of from $-20°$ to $30°$ C. In particular, the mixed anhydride is preferably kept at $-20°$ to $10°$ C., still preferably at $-10°$ to $0°$ C.

The polyvinyl alcohol (hereinafter abbreviated as PVA) which can be used as a starting material includes PVA having a degree of saponification of 70 to 100%; PVA modified through copolymerization (modifying groups include COONa, $Si(OH)_3$, $N(CH_3)_3.Cl$, $C_9H_{19}COO$, $SO_3Na$, and $C_{12}H_{25}$); PVA modified through chain transfer (modifying groups include COONa, SH, and $C_{12}H_{25}S$); and PVA modified by block polymerization (modifying groups include COOH, $CONH_2$, COOR (R: alkyl), and $C_6H_5$). PVA to be used can have a degree of polymerization of 100 to 3000. Modified or unmodified PVA having a degree of polymerization of 100 to 2000 is preferred.

The base whose conjugate acid has a pKa of 11 or more, which can be used in the preparation of the ester-modified PVA, includes primary amines (e.g., $(CH_3)_3CNH_2$ and $(C_2H_5)_3CNH_2$), secondary amines (e.g., dipropylamine, dibutylamine, dihexylamine, piperidine, and pyrrolidine), amidine compounds (e.g., amidine and 1,8-diazabicyclo [5.4.0]undec-7-ene (DBU)), guanidine compounds (e.g., guanidine and tetramethylguanidine), and lithium amide compounds (e.g., lithium diisopropylamide and lithium hexamethyldisilazide). Amidine compounds and guanidine compounds are preferred, and DBU is still preferred of them.

The base is preferably used in an amount of 0.1 to 10.0 equivalents, particularly 0.5 to 3.0 equivalents, to the mole number of the active carboxylic acid derivative.

Solvents for use in the esterification reaction include DMSO, DMF, DMAC, and water. Preferred of them are DMSO, DMF, and DMAC. DMSO is still preferred.

The reaction is preferably carried out at a temperature of $10°$ to $100°$ C., particularly $20°$ to $50°$ C. A catalyst accelerating the reaction, such as 4-dimethylaminopyridine (DMAP) or 4-pyrrolidinopyridine (PPY), is preferably added to the reaction system. The catalyst is used preferably in an amount of 0.01 to 5.0 equivalents, particularly 0.1 to 2.0 equivalents, to the mole number of the active carboxylic acid derivative.

Specific but non-limiting examples of the ester-substituted polyvinyl alcohol obtained in the present invention are shown below.

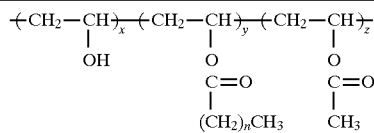
| Polymer No. | n | x (mol %) | y (mol %) | z (mol %) |
|---|---|---|---|---|
| 1 | 2 | 87.5 | 0.5 | 12 |
| 2 | 2 | 68 | 20 | 12 |
| 3 | 3 | 86.8 | 1.2 | 12 |
| 4 | 4 | 85 | 3.0 | 12 |
| 5 | 5 | 79.5 | 2.5 | 18 |
| 6 | 7 | 71.0 | 11.0 | 18 |
| 7 | 9 | 96.8 | 2.2 | 1 |
| 8 | 11 | 98.2 | 0.8 | 1 |
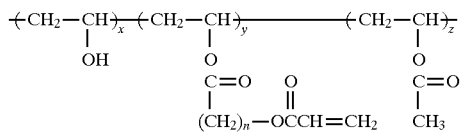
| Polymer No. | n | x (mol %) | y (mol %) | z (mol %) |
|---|---|---|---|---|
| 9 | 2 | 87.5 | 0.5 | 12 |
| 10 | 3 | 97.4 | 0.6 | 2 |
| 11 | 4 | 86.4 | 1.6 | 12 |
| 12 | 5 | 80.0 | 2.0 | 18 |
| 13 | 6 | 84.8 | 3.2 | 12 |
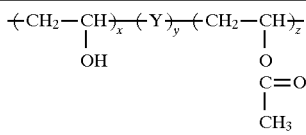
| Polymer No. | Y | x (mol %) | y (mol %) | z (mol %) |
|---|---|---|---|---|
| 14 | —CH₂CH—<br>│<br>O<br>│<br>C=O<br>│<br>(CH₂)₄OC—C=CH₂<br>‖  │<br>O  CH₃ | 86.3 | 1.7 | 12 |
| 15 | —CH₂CH—<br>│<br>O<br>│<br>C=O<br>│<br>(CH₂)₄OCH=CH₂ | 97.3 | 1.7 | 1 |
| 16 | —CH₂CH—<br>│<br>O<br>│<br>C=O<br>│<br>(CH₂)₄CH—CH₂<br>\\ /<br>O | 87.4 | 0.6 | 12 |
| 17 | —CH₂CH—<br>│<br>O<br>│<br>C=O<br>│<br>(CH₂)₂—CO—⌬—CH=CH₂<br>‖<br>O | 80.8 | 1.2 | 18 |

-continued
| 18 | 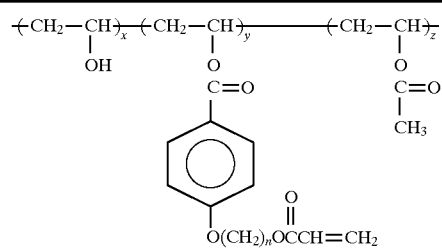 | 86.3 | 1.7 | 12 |
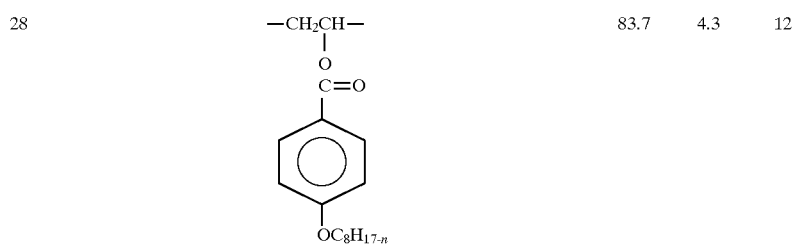
| Polymer No. | n | x (mol %) | y (mol %) | z (mol %) |
|---|---|---|---|---|
| 19 | 2 | 84.5 | 3.5 | 12 |
| 20 | 3 | 85.5 | 2.5 | 12 |
| 21 | 4 | 87.1 | 0.9 | 12 |
| 22 | 4 | 86.3 | 1.7 | 12 |
| 23 | 4 | 97.2 | 1.8 | 1 |
| 24 | 5 | 87.2 | 0.8 | 12 |
| 25 | 6 | 76.2 | 11.8 | 12 |
| 26 | 7 | 73.9 | 14.1 | 12 |
| 27 | 8 | 94.4 | 0.6 | 5 |
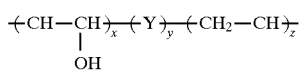
| Polymer No. | Y | x (mol %) | y (mol %) | z (mol %) |
|---|---|---|---|---|
| 28 | 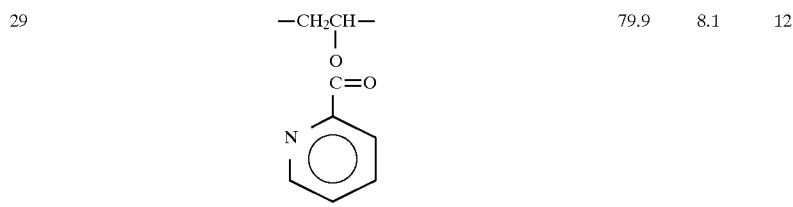 | 83.7 | 4.3 | 12 |
| 29 | | 79.9 | 8.1 | 12 |
| 30 | 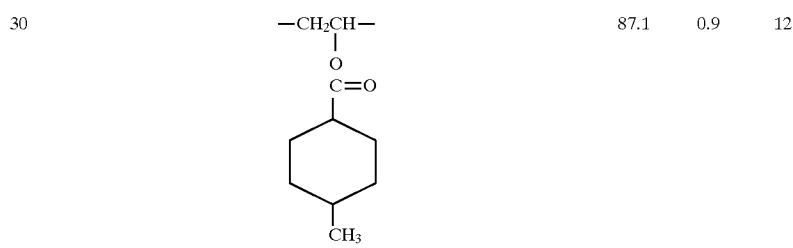 | 87.1 | 0.9 | 12 |

-continued

| No. | Structure | x | y | z |
|---|---|---|---|---|
| 31 | —CH₂CH—<br>\|<br>O<br>\|<br>C=O<br>\|<br>CH=CH—⌬—OC₆H₁₃₋ₙ | 75 | 13.0 | 12 |
| 32 | —CH₂CH—<br>\|<br>O<br>\|<br>C=O<br>\|<br>(furan) | 85.9 | 2.1 | 12 |

$$-(CH_2-CH)_x-(Y)_y-(CH_2-CH)_z-$$
$$\quad\quad |\quad\quad\quad\quad\quad\quad\quad\quad\quad |$$
$$\quad\quad OH\quad\quad\quad\quad\quad\quad\quad O$$
$$\quad\quad\quad\quad\quad\quad\quad\quad\quad\quad\quad\quad C=O$$
$$\quad\quad\quad\quad\quad\quad\quad\quad\quad\quad\quad\quad |$$
$$\quad\quad\quad\quad\quad\quad\quad\quad\quad\quad\quad\quad CH_3$$

| Polymer No. | Y | x (mol %) | y (mol %) | z (mol %) |
|---|---|---|---|---|
| 33 | —CH₂CH—<br>\|<br>O<br>\|<br>C=O<br>\|<br>⌬<br>\|<br>O(CH₂)₄OCC=CH₂<br>∥    \|<br>O    CH₃ | 87.2 | 0.8 | 12 |
| 34 | —CH₂CH—<br>\|<br>O<br>\|<br>C=O<br>\|<br>⌬<br>\|<br>O(CH₂)₄OCH=CH₂ | 97.8 | 1.2 | 1 |
| 35 | —CH₂CH—<br>\|<br>O<br>\|<br>C=O<br>\|<br>⌬<br>\|<br>O(CH₂)₄CH—CH₂<br>         \\  /<br>          O | 95 | 3.0 | 2 |

-continued

| | | | | |
|---|---|---|---|---|
| 36 | 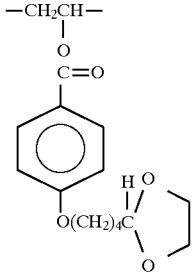 | 71 | 17.0 | 12 |
| 37 | 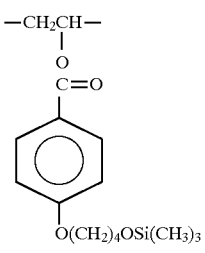 | 87.2 | 0.8 | 12 |
| 38 | 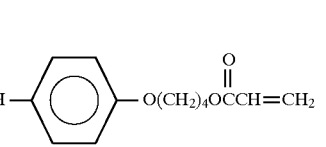 | 87.2 | 0.8 | 12 |
| 39 | 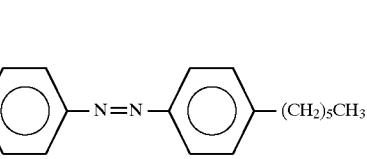 | 68 | 20 | 12 |
| 40 | 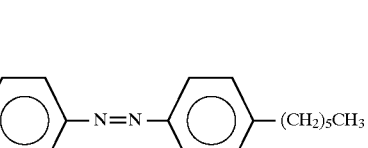 | 64 | 24 | 12 |
| 41 | 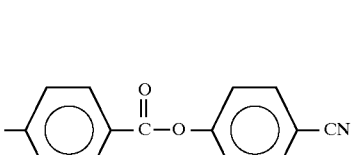 | 59 | 40 | 1 |
| 42 | 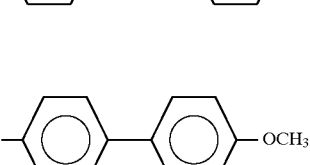 | 54 | 45 | 1 |

The substituent capable of forming a new bond intermolecularly or intramolecularly includes those described in S. R. Sandler & W. Karo, *Organic Functional Group Preparations,* Vols. 1 and 2, Academic Press (New York) (1968). Preferred among them are functional groups capable of polymerization, for example, multiple bonds (composed either of carbon atoms or non-carbon atoms) and heterocyclic small-membered rings, e.g., an oxirane ring and an aziridine ring. A double bond-containing group, i.e., an acrylic group and a vinyl ether group, and an epoxy group, are still preferred as reported by R. A. M. Kikmet, et al., in *Macromolecules,* Vol. 25, p. 4194 (1992) and *Polymer,* Vol. 34, No. 8, p. 1736 (1993) and by D. J. Broer, et al. in *Macromolecules,* Vol. 26, p. 1244 (1993).

The substituent capable of forming a new bond intermolecularly or intramolecularly reacts to each other between the alignment films, between the anisotropic layers and between the alignment film and the anisotropic layer, to prepare a polymer composition.

The discotic liquid crystal compounds which can be used in the invention typically include the benzene derivatives, triphenylene derivatives, truxene derivatives, and phthalocyanine derivatives described in C. Destrade, et al, *Mol. Crystal. Liq. Cryt.*, Vol. 71, p. 111 (1981); the cyclohexane derivatives described in B. Kohne, et al., *Angew. Chem.*, Vol. 96, p. 70 (1984); and the aza-crown compounds and phenylacetylene macrocyclic compounds described in J. M. Lehn, et al., *J. Chem. Soc. Chem. Commun.*, p. 1794 (1985) and J. Zhang, et al., *J. Am. Chem. Soc.*, Vol. 116, p. 2655 (1994). In general, the discotic liquid crystal compounds have these compounds as a skeleton, which are radially substituted with a straight-chain alkyl or alkoxy group, a substituted benzoyloxy group, etc. as a side chain.

Additionally, the discotic liquid crystals of organometallic complexes described in The Chemical Society of Japan (ed.), *Kagaku Sosetsu*, Vol. 22, "Chemistry of Liquid Crystals", p. 135 (1994) are useful. The discotic liquid crystal behavior of the compounds disclosed seems attributed to ligands arranged around the center metal atom on the same plane.

It is known that the discotic liquid crystal phases are divided into a columnar phase in which the cores of the disc-shaped molecules are stacked to form a column, a discotic nematic phase in which the disc-shaped molecules are aggregated randomly, and a chiral discotic nematic phase. While the columnar phase is often observed, discotic nematic phase is rare to find as described in W. H. de jeu, *Physical Properties of Liquid Crystalline Materials*, Gordon and Breach, Science Publishers (1980).

Of various discotic liquid crystals, those exhibiting a discotic nematic liquid crystal phase include truxene derivatives, triphenylene derivatives, benzene derivatives having a substituted phenylacetylene as a side chain, and phenylacetylene macrocylic compounds. In particular, triphenylene derivatives are easy to synthesize and easily form a mono-domain discotic nematic phase that is advantageous for making use of as an optical device.

The optically anisotropic layer for use in the present invention is a layer exhibiting negative birefringence comprising at least one discotic liquid crystal compound, and the discotic plane of the discotic liquid crystal compound tilts with respect to the surface of the transparent substrate. Also, the angle between the discotic plane and the surface of the transparent substrate varies in the depth direction of the optically anisotropic layer (depending on the depth of the optically anisotropic layer).

The angle of the discotic plane (tilt angle) generally increases or decreases in the depth direction of the optically anisotropic layer and with the increase of the distance from the bottom surface of the anisotropic layer. The tilt angle preferably increases with the increase of the distance from the bottom surface of the anisotropic layer. Moreover, examples of the variation of the tilt angle include continuous increase, continuous decrease, intermittent increase, intermittent decrease, variation including continuous increase and continuous decrease, variation including intermittent increase and intermittent decrease. The intermittent variation may include the region where the tilt angle does not vary on the way of the thickness direction. The tilt angle preferably increases or decreases totally, even if the optically anisotropic layer includes such a region where the tilt angle does not vary. Further, the tilt angle preferably increases totally, more preferably varies continuously.

When the ester-substituted PVA of the invention is used as a liquid crystal alignment (orientation) layer, it can be used either alone or as a mixture with a conventional polymer known for liquid crystal alignment. In the latter case, the ester-substituted PVA is used in a proportion of 10% to 100% by weight, preferably 30% by weight or more and less than 100% by weight.

A liquid crystal alignment layer of the ester-substituted PVA can be formed usually by applying the polymer to a substrate and, after drying, rubbing the coating film. The substrate to be used can be glass, a commercially available substrate, such as Zeonex (a product of Nippon Zeon Co., Ltd.), ARTON (a product of Japan Synthetic Rubber Co., Ltd.), and Fuji Tack (a product of Fuji Photo Film Co., Ltd.), polycarbonate, polyacrylate, polysulfone, and polyether sulfone.

Application of the ester-substituted PVA can be carried out by spin coating, dip coating, extrusion coating, or bar coating. A preferred film thickness is 0.1 to 10 $\mu$m.

Rubbing for enhancing the function as an alignment layer can be carried out using a rubbing roll wrapped in rubbing cloth, such as velvet. Rubbing may be conducted either batchwise or continuously.

Drying is at 20° to 110° C., preferably 60° to 100° C., and for 1 minute to 36 hours, preferably 5 to 30 minutes.

The discotic liquid crystal compounds can be used either individually or as a mixture thereof. Examples of useful discotic liquid crystal compositions are described in Japanese Patent Application Nos. Hei-6-50385 (corresponding to JP-A-7-258167), Hei-6-70591 (corresponding to JP-A-7-281028), and Hei-7-245873.

The liquid crystal layer can be formed by coating in the same manner as for the PVA alignment layer. A preferred thickness of the liquid crystal layer is 0.1 to 20 $\mu$m. After drying, the coating film is heated to orientate the liquid crystal molecules. If desired, the molecular orientation can be fixed by heating or irradiation with light as taught in Japanese Patent Application No. Hei-6-100077 (corresponding to JP-A-8-27284).

The present invention will now be illustrated in greater detail with reference to Examples, but it should be understood that the invention is not deemed to be limited thereto.

EXAMPLE 1

Synthesis of Polymer 21

In a 500 ml three-necked flask were charged 35.2 g of PVA (MP-203, produced by Kurary Co., Ltd.; degree of saponification: 88%; degree of polymerization: 300; Mw: 14700), 0.27 g (1.23 mmol) of 4-dimethylaminopyridine, and 150 ml of DMSO and heated at 45° C. to dissolve.

Separately, in a 100 ml three-necked flask were charged 1.41 g (12.3 mmol) of methanesulfonyl chloride, 0.1 ml of nitrobenzene, and 12 ml of THF. A solution of 3.26 g (12.3 mmol) of 4-(4-acryloyloxybutyloxy)benzoic acid and 1.58 g (12.3 mmol) of diisopropylethylamine in 24 ml of THF was added thereto dropwise under cooling with ice while stirring. After the addition, the stirring was continued for an additional 30 minute period under ice-cooling to prepare a mixed anhydride.

To the PVA/DMSO solution above prepared was added 4.2 ml (28 mmol) of DBU, and the THF solution of the mixed anhydride was added dropwise thereto at 45° C. over a period of 1 hour while stirring. After the addition, the stirring was continued for an additional 4 hour period at the same temperature. To the reaction mixture was added 90 ml of isopropyl alcohol, and the solution was added dropwise to 1.5 l of ethyl acetate to precipitate the polymer, which was then collected by filtration, washed in 90 ml of methanol for 1 hour with stirring, followed by filtration. The collected polymer was dried in vacuo to give 31.7 g (90%) of polymer 21.

NMR Analysis:

The NMR spectrum of polymer 21 was taken in DMSO-$d_6$. As a result, polymer 21 showed not only the protons assigned to the main chain, the hydroxyl group and the acetyl group but the following protons, which are not observed with the starting MP-203, with weak intensity.

d=7.9 and 7.0 ppm (assigned to the proton of a phenylene group);

d=6.3, 6.2, and 5.9 ppm (assigned to the proton of a vinyl group)

UV Absorption Spectrum and Determination of Rate of Introduction y:

Polymer 21 precisely weighing 20 mg was put in a 1000 ml measuring flask, and distilled water was added to prepare a 0.02% aqueous solution. An absorption spectrum was measured on the solution with a UV-visible spectrophotometer (UV-2200, manufactured by Shimadzu Corp.).

Maximum absorption wavelength ($\lambda_{max}$): 260 nm

Absorbance (abs260): 0.620

Similarly the absorption spectrum of the starting polyvinyl alcohol (MP-203) was taken. In the wavelength range of from 220 to 400 nm, there was no absorption maximum but a weak absorption gently sloping downward from the shorter wavelength side toward the longer wavelength side. The absorbance at 260 nm was 0.011.

Further, a $1\times10^{-4}$M methanolic solution of methyl 4-(4-acryloyloxybutyloxy)benzoate was prepared, and the absorption spectrum was taken similarly.

$\lambda_{max}$: 256 nm abs260: 1.84

Molecular absorptivity coefficient ($\epsilon$): $1.84\times10^4 M^{-1}\cdot cm$ Accordingly, it was concluded that the absorption band of polymer 21 ($\lambda_{max}$: 260 nm) is attributable to introduction of 4-(4-acryloyloxybutyloxy)benzoic acid to the hydroxyl group of PVA via an ester linkage. The rate of introduction y was found to be 0.9 from the measured absorbances.

EXAMPLE 2

Synthesis of Polymer 21

In a 500 ml three-necked flask were charged 35.2 g of PVA (MP-203), 0.48 g (3.92 mmol) of 4-dimethylaminopyridine, and 150 ml of DMSO and heated to dissolve at 45° C.

Separately, in a 100 ml three-necked flask were charged 4.5 g (39.2 mmol) of methanesulfonyl chloride, 0.1 ml of nitrobenzene, and 12 ml of THF. A solution of 10.36 g (39.2 mmol) of 4-(4-acryloyloxybutyloxy)benzoic acid and 5.07 g (39.2 mmol) of diisopropylethylamine in 24 ml of THF was added thereto dropwise under cooling with ice while stirring. After the addition, the stirring was continued for an additional 30 minute period under ice-cooling to prepare a mixed anhydride.

To the PVA/DMSO solution above prepared was added 3.76 g (24.7 mmol) of DBU, and the THF solution of the mixed anhydride was added dropwise thereto at 45° C. over a period of 1 hour while stirring. After the addition, the stirring was continued for an additional 2 hour period at the same temperature. To the reaction mixture was added 90 ml of isopropyl alcohol, and the solution was added dropwise to 1.5 l of ethyl acetate to precipitate the polymer, which was then collected by filtration, washed in 90 ml of methanol for 1 hour with stirring, followed by filtration. The collected polymer was dried in vacuo to give 32.0 g (91%) of polymer 21.

The UV absorption spectrum of polymer 21 was measured in the same manner as in Example 1, and the rate of introduction y was found to be 0.9 from the absorbance at 260 nm.

EXAMPLE 3

Synthesis of Polymer 22

In a 300 ml three-necked flask were charged 17.6 g of PVA (MP-203), 0.36 g (2.8 mmol) of 4-dimethylaminopyridine, and 112 ml of DMSO and heated to dissolve at 45° C.

Separately, in a 100 ml three-necked flask were charged 3.2 g (28.0 mmol) of methanesulfonyl chloride, 0.1 ml of nitrobenzene, and 14 ml of THF. A solution of 7.4 g (28.0 mmol) of 4-(4-acryloyloxybutyloxy)benzoic acid and 4.9 ml (28.0 mmol) of diisopropylethylamine in 28 ml of THF was added thereto dropwise under cooling with ice while stirring. After the addition, the stirring was continued for an additional 30 minute period under ice-cooling to prepare a mixed anhydride.

To the PVA/DMSO solution above prepared was added 4.2 ml (28.0 mmol) of DBU, and the THF solution of the mixed anhydride was added thereto dropwise at 45° C. over a period of 1 hour while stirring. After the addition, the stirring was continued for an additional 4 hour period at the same temperature. To the reaction mixture was added 90 ml of isopropyl alcohol, and the solution was added dropwise to 1.1 l of ethyl acetate to precipitate the polymer, which was then collected by filtration, washed in 90 ml of methanol for 1 hour with stirring, followed by filtration. The collected polymer was dried in vacuo to give 15.6 g (89%) of polymer 22.

The UV absorption spectrum of polymer 22 was measured in the same manner as in Example 1, and the rate of introduction y was found to be 1.7 from the absorbance at 260 nm.

COMPARATIVE EXAMPLE 1

Synthesis of Polymer 21

In a 300 ml three-necked flask were charged 17.6 g of PVA (MP-203), 0.36 g (2.8 mmol) of 4-dimethylaminopyridine, and 112 ml of DMSO and heated to dissolve at 45° C.

Separately, in a 100 ml three-necked flask were charged 3.2 g (28.0 mmol) of methanesulfonyl chloride, 0.1 ml of nitrobenzene, and 14 ml of THF. A solution of 7.4 g (28.0 mmol) of 4-(4-acryloyloxybutyloxy)benzoic acid and 4.9 ml (28.0 mmol) of diisopropylethylamine in 28 ml of THF was added thereto dropwise under cooling with ice while stirring. After the addition, the stirring was continued for an additional 30 minute period under ice-cooling to prepare a mixed anhydride.

To the PVA/DMSO solution above prepared was added 4.9 ml (28.0 mmol) of diisopropylethylamine, and the THF solution of the mixed anhydride was added thereto dropwise at 45° C. over a period of 1 hour while stirring. After the addition, the stirring was continued for an additional 4 hour period at the same temperature. To the reaction mixture was added 90 ml of isopropyl alcohol, and the solution was added dropwise to 1.1 l of ethyl acetate to precipitate the polymer, which was then collected by filtration, washed in 90 ml of methanol for 1 hour with stirring, followed by filtration. The collected polymer was dried in vacuo to give 15.3 g (87%) of polymer 21.

The UV absorption spectrum of polymer 21 was measured in the same manner as in Example 1, and the rate of introduction y was found to be 0.9 from the absorbance at 260 nm.

The base used in the esterification of PVA and the reaction rate of Examples 1 to 3 and Comparative Example 1 are shown in Table 1 below.

TABLE 1

| Example No. | Base | | | Reaction Rate[2] (%) |
|---|---|---|---|---|
| | Kind | pKa of Conjugate Acid | Amount[1] (equi.) | |
| 1 | DBU | 11.5 | 1.8 | 53 |
| 2 | DBU | 11.5 | 0.63 | 16 |
| 3 | DBU | 11.5 | 1.0 | 22 |
| Compara. Example 1 | iPr$_2$NEt[3] | 10.8 | 1.0 | 12 |

Note:
[1] To the mole number of the charged carboxylic acid.
[2] The mole number of the introduced carboxylic acid/the mole number of the charged carboxylic acid.

3)
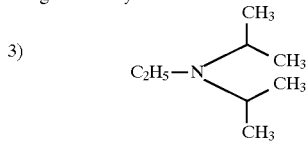

On comparing Examples 3 and Comparative Example 1, in which the same amount of a base is used, it is seen from Table 1 that the reaction rate of Example 3 is obviously higher than that of Comparative Example 1. It is possible to achieve a reaction rate of 50% or higher by altering the amount of the base as in Example 1.

EXAMPLE 4

Preparation of Thin Film

Polymer 21 was applied to a 120 μm thick triacetyl cellulose film having a gelatin subbing layer (0.1 μm thick) (a product of Fuji Photo Film Co., Ltd.) and dried with hot air at 80° C. The coating film was rubbed to form a liquid crystal alignment layer. Taking the in-plane principle refractive indices as nx and ny, the refractive index in the thickness direction nz, and the thickness d, |nx−ny|×d and {(nx+ny)/2−nz}×d of the resulting triacetyl cellulose film were determined. The thickness was measured with a micrometer. Retardations (R$_e$) in various directions were measured with an ellipsometer (AEP-100, manufactured by Shimadzu Corp.). As a result, |nx−ny|×d and {(nx+ny)/2−nz}×d of the triacetyl cellulose film were 3 nm and 60 nm, respectively. Accordingly, the triacetyl cellulose film was found to be substantially negatively uniaxial having its optic axis almost in the normal direction of the film.

A coating composition comprising 1.8 g of a discotic liquid crystal compound (2,3,6,7,10,11-hexakis[4-(4-acryloyloxybutyloxy)benzyloxy]triphenylene), 0.2 g of ethylene glycol-modified trimethylolpropane triacrylate (V#360, produced by Osaka Yuki Kagaku Kogyo K.K.), 0.04 g of cellulose acetate butyrate (CAB551-0.2, produced by Eastman Chemical Co., Ltd.), 0.06 g of a photopolymerization initiator (Irgacure 907, produced by Ciba-Geigy Ltd.), 0.02 g of a sensitizer (Kayacure DETX, produced by Nippon Kayaku Co., Ltd.), and 3.43 g of a solvent (methyl ethyl ketone) was applied to the liquid crystal alignment layer with a wire bar (#3 bar). The coated film was fixed by a metal frame and heated in a thermostat at 120° C. for 3 minutes to orientate the discotic compound. While keeping the temperature at 120° C., the liquid crystal layer was further irradiated with ultraviolet light of a high-pressure mercury lamp (120 W/cm) for 1 second, followed by allowing to cool to room temperature to prepare a thin film having a 1.8 μm thick liquid crystal layer containing the discotic compound.

The retardation of the resulting thin film was measured with an ellipsometer (AEP-100) from various directions in the plane including the rubbing axis and perpendicular to the retardation film surface. Further the optical characteristics of the substrate at the measured site (with the discotic compound having been removed) were determined similarly. From the measured values, it was found that the resulting optically anisotropic layer exhibits negative birefringenece and the plane of the discotic compound molecules tilts with respect to the surface of the substrate at an incline (tilt angle) continuously varying from 2° to 70°.

While the invention has been described in detail and with reference to specific examples thereof, it will be apparent to one skilled in the art that various changes and modifications can be made therein without departing from the spirit and scope thereof.

What is claimed is:

1. A process for producing ester-substituted polyvinyl alcohol from a compound having a carboxyl group and polyvinyl alcohol, which comprises converting the compound having a carboxyl group to an active derivative thereof and reacting the active carboxylic acid derivative with polyvinyl alcohol in the presence of a base the conjugate acid of which has a pKa of 11 or more, wherein said active carboxylic acid derivative is a mixed anhydride, said base is diazabicyclo[5.4.0]undec-7-ene and said reaction of the active carboxylic acid derivative and polyvinyl alcohol is preformed in the presence of dimethyl sulfoxide as a solvent.

2. A process according to claim 1, wherein said compound having a carboxyl group is a compound having a functional group susceptible to addition reaction or hydrolysis.

3. A thin film provided on a transparent substrate, which comprises:

(I) a film of ester-substituted polyvinyl alcohol provided on the transparent substrate, wherein the film of ester-substituted polyvinyl alcohol is produced by a process comprising:
      converting a compound (i) having at-least one substituent capable of forming a new bond intermolecularly or intramolecularly and (ii) a carboxyl group, to an active derivative thereof; and reacting the active carboxylic acid derivative with polyvinyl alcohol in the presence of a base the conjugate acid of which has a pKa of 11 or more; and (II) at least one optically anisotropic layer provided on the film of ester-substituted polyvinyl alcohol, wherein said at least one optically anisotropic layer contains at least one discotic liquid crystal compound which (i) has at least one substituent capable of forming a new bond intermolecularly or intramolecularly and (ii) is capable of forming a discotic nematic phase.

4. A thin film according to claim 3, wherein said at least one substituent capable of forming a new bond intermolecularly or intramolecularly forms a new bond to prepare a polymer composition.

5. A thin film according to claim 3, wherein said at least one optically anisotropic layer containing at least one discotic liquid crystal compound further contains at least one compound selected from discotic liquid compound other than said at least one discotic liquid crystal compound and other organic compounds.

6. A thin film according to claim 3, wherein the disc plane of said discotic liquid crystal compound tilts with respect to the plane of said transparent substrate, with the tilt angle between the disc plane and the transparent substrate varying in the thickness direction of the optically anisotropic layer.

7. A process according to claim 1, wherein said compound having a carboxyl group is selected from the group consisting of saturated fatty acids, unsaturated fatty acids, carbocyclic carboxylic acids, and heterocyclic carboxylic acids.

8. A process according to claim 1, wherein said compound having a carboxyl group is selected from the group consisting of $C_3$–$C_{10}$ n-carboxylic acid, $C_{12}$ n-carboxylic acid, acrylic acid, methacrylic acid, crotonic acid, propynoic acid, 2-pentenoic acid, 2-heptenoic acid, 2-octenoic acid, cyclohexane carboxylic acid, benzoic acid, 4-alkylbenzoic acid, naphthalenecarboxylic acid, cinnamic acid, furanecarboxylic acid, nicotinic acid and pyrrolecarboxylic acid.

9. A process according to claim 1, wherein said mixed anhydride is prepared from a compound selected from the group consisting of carbonic acid esters, O-alkyl dithiocarbonic acids, carboxylic acids, sulfonic acids and inorganic acids.

10. A process according to claim 1, wherein said mixed anhydride is prepared from a compound selected from the group consisting of monoethyl carbonate, O-ethyl dithiocarbonic acid, pivalic acid, trifluoroacetic acid, methanesulfonic acid, toluenesulfonic acid, and phosphoric acid.

* * * * *